R. C. MONTGOMERY.
TIRE HOLDER.
APPLICATION FILED NOV. 8, 1919.
1,374,089.
Patented Apr. 5, 1921.
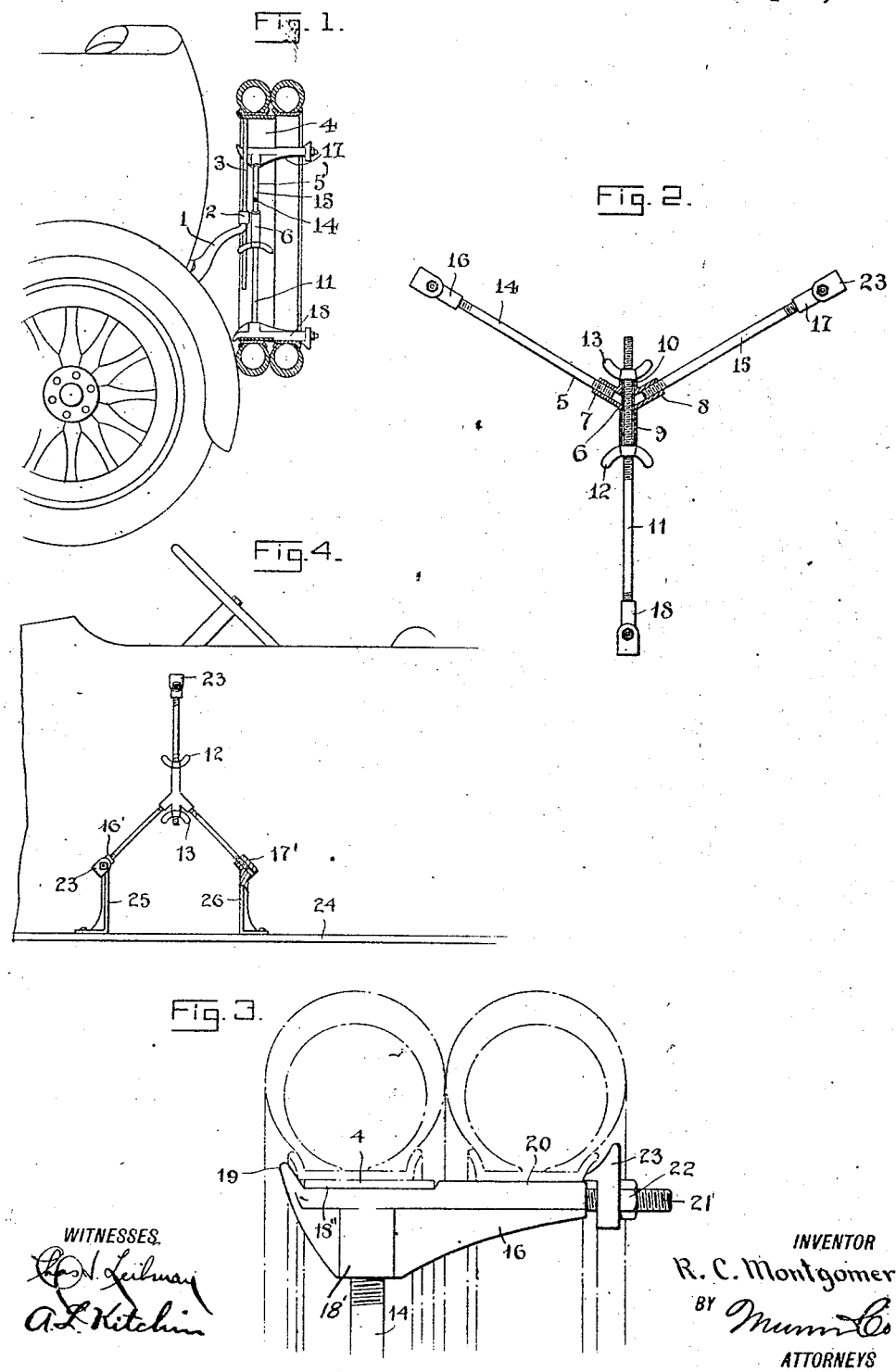

UNITED STATES PATENT OFFICE.

ROSCOE C. MONTGOMERY, OF BROOKLYN, NEW YORK, ASSIGNOR OF ONE-HALF TO JOHN R. LETTENBERGER, JR., OF WOODHAVEN, NEW YORK.

TIRE-HOLDER.

1,374,089.  Specification of Letters Patent.  Patented Apr. 5, 1921.

Application filed November 8, 1919. Serial No. 336,680.

*To all whom it may concern:*

Be it known that I, ROSCOE C. MONTGOMERY, a citizen of the United States, and a resident of the city of New York, borough of Brooklyn, in the county of Kings and State of New York, have invented a new and useful Tire-Holder, of which the following is a full, clear, and exact description.

This invention relates to tire holders, and has for an object to provide an improved construction wherein one or more tires may be properly supported at a convenient point on an automobile.

Another object in view is to provide a holder which may be fastened rigidly to certain parts of the automobile, or adjustably connected to a permanent rim carrying wheel or fixture.

A further object of the invention is to provide a holder wherein the carrying arms are radially movable or expansible so as to snugly fit into a tire carrying rim and to properly fit demountable rims carrying tires.

In the accompanying drawing:

Figure 1 is a side view of a rear part of an automobile, with an embodiment of the invention shown applied thereto, said embodiment and associate parts being shown in section.

Fig. 2 is a plan view of a holder embodying the invention, certain parts being shown in section for better illustrating the way the adjustment is produced.

Fig. 3 is an enlarged fragmentary side view of one of the arms shown in Fig. 2, the same being shown in connection with two tires when they are supporting demountable rims.

Fig. 4 is a fragmentary side view of an automobile showing a running board together with an embodiment of the invention shown applied to said running board.

Heretofore it has been common to provide a rim and suitable supports in order to hold an extra tire. This arrangement is usually carried at the back of the automobile, though sometimes it is carried on the running board. With either arrangement clamping or encircling straps are provided so as to hold tires mounted thereon properly in place. In many instances it is desired to carry more than one tire so that a rather unsightly arrangement is presented when an extra tire is clamped on to the first tire. The extra tire is usually thought necessary when taking long trips, though under ordinary circumstances a single tire may well answer all purposes. The present invention provides a construction which will answer in an efficient manner all of the requirements above suggested, as it may be used for carrying one or a plurality of tires and may be used either as a permanent fixture or as a temporary fixture.

Referring to the accompanying drawing by numerals, 1 indicates a bracket which is provided with what may be termed a hub 2 from which a number of spokes 3 radiate. The outer ends of the spokes 3 are connected in any suitable manner with a rim 4. This construction is old and well known and has heretofore been used as means for carrying a single tire. As shown in Fig. 1 an embodiment of the invention is disclosed applied to the rim 4 and thereby presents a structure which will easily support two tires and their accompanying demountable rims. The holder 5 is provided with a central fork-shaped member 6 having internally threaded extensions 7 and 8 and tubular extensions 9 and 10, through which the threaded end of rod 11 extends. Winged nuts 12 and 13 are arranged on the threaded end of rod 11 so as to adjust the same longitudinally in respect to the forked member 6. Associated with rod 11 are what may be termed fixed arms 14 and 15, which are threaded into members 7 and 8, said arms being also threaded into the various supporting feet 16, 17 and 18. These supporting feet are shown more particularly in Fig. 3, wherein it will be seen that each foot is provided with an internally threaded enlargement 18', a depression 18" for receiving the rim 4, a rear flange 19, and a raised portion 20 for receiving the outer tire while the inner tire rests on the rim 4 and against the flange 19. A threaded extension 21 extends from the end of the foot 16 opposite the flange 19, said threaded extension accommodating the nut 22 which actuates the wedge 23 which forces the demountable rim of the outer shoe toward the inner shoe and consequently forces the inner shoe so that its demountable rim will press against the flange 19. The tires and rims are not clamped directly in position, but are merely crowded together and against the flange 19 of the respective feet 16, 17 and 18. This will effectively hold the tires in place and against rattling. In the drawing three feet have been shown, namely feet 16, 17 and 18, and an adjustable rod 11 has been provided for the foot 18, but it will be evident, if desired, a greater number of rods and arms and corresponding feet could be used without departing from the spirit of the invention.

Where an automobile is already provided with a rim 4 and associate parts the device may be somewhat collapsed or drawn together and then placed in position, after which nuts 12 and 13 will adjust the foot 18 until a proper pressure is provided for causing the various feet to grip rim 4. An extra tire may then be provided. By the radial adjustment of one of the feet, or all of the feet, the holder may be used in connection with rims 4 of different sizes without changing any parts.

In addition to being used as an attachment as illustrated in Fig. 1 the device may be used as a primary or independent holder if the central T-shaped member 6 is mounted on the bracket 1, or in any desired manner. It is also evident that the holder could be arranged at other places than the rear of the automobile, as for instance on the running board 24, (Fig. 4). When used on the running board bracket extensions 25 and 26 project from the feet 16' and 17', said brackets being preferably formed integral therewith so as to hold the entire construction in proper place without danger of becoming loose. The brackets 25 and 26 are bolted or otherwise rigidly clamped to the running board 24. When used on the running board the feet could be made to receive one, or any number of tires without departing from the spirit of the invention.

What I claim is:

1. A tire holder comprising a plurality of radiating arms radially adjustable, a foot on the outer end of each of said arms formed with a depression adapted to receive the rim of a tire holder, an upstanding flange at one end, and threaded projection at the opposite end; a clamping wedge loosely mounted on said threaded projection, and a nut screwed on to said threaded projection for moving the clamping wedge toward said flange.

2. In a spare tire holder having adjustable radial arms, a foot for each arm for engaging the rims of the spare tires, said foot comprising a body formed with a threaded socket for receiving an arm, a depression in line with the socket, a flange extending from the body adjacent one end of said depression, a threaded projection extending from the body at the end opposite to said flange, and an adjustable wedge member carried by said threaded projection for wedging a plurality of tire supporting rims on said foot.

ROSCOE C. MONTGOMERY.